United States Patent [19]

Norton

[11] Patent Number: 4,470,106
[45] Date of Patent: Sep. 4, 1984

[54] SHOP LIGHT

[76] Inventor: Larry G. Norton, 9520 Shipe Rd., Corryton, Tenn. 37721

[21] Appl. No.: 482,546

[22] Filed: Apr. 6, 1983

[51] Int. Cl.³ ............................................. F21V 21/00
[52] U.S. Cl. .................................. 362/398; 362/285; 362/287; 362/376; 362/419; 362/426; 362/427; 362/430; 248/278; 248/281.1
[58] Field of Search ............... 362/285, 287, 376, 398, 362/419, 426, 427, 430; 248/278, 281.1

[56] References Cited

U.S. PATENT DOCUMENTS

| 1,932,143 | 10/1933 | Piercy | 362/398 |
| 2,506,400 | 5/1950 | Wietz | 362/398 |
| 2,747,079 | 5/1956 | Kubiliunas | 362/398 |
| 3,479,500 | 11/1969 | Duddy | 362/396 |
| 4,019,047 | 4/1977 | Frey | 362/396 |
| 4,128,226 | 12/1978 | Ross et al. | 362/396 |

Primary Examiner—Stephen J. Lechert, Jr.
Attorney, Agent, or Firm—Pitts, Ruderman & Kesterson

[57] ABSTRACT

An improved shop light for being releasably mounted in a desired location for illuminating a work area. The shop light (10) comprises a handle member (12) provided with a light bulb socket (16) for releasably receiving a light bulb (18). Electricity for powering the light bulb (18) is supplied by a cord (20) received in handle member (12). A guard member (34) is releasably engaged to the handle member (12) in order to protect the light bulb (18) from damage. Magnetic mounting means (52) are provided for selectively mounting the shop light (10) on a metalic surface, such means being capable of selectively pivoting the shop light (10) to most desirably illuminate a preselected work area. The shop light (10) is further provided with a hook member (50) for hanging the shop light (10) at a desired location.

5 Claims, 3 Drawing Figures

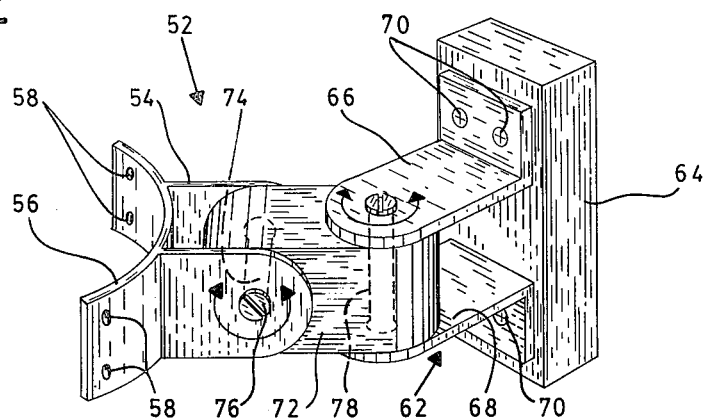
Fig. 2
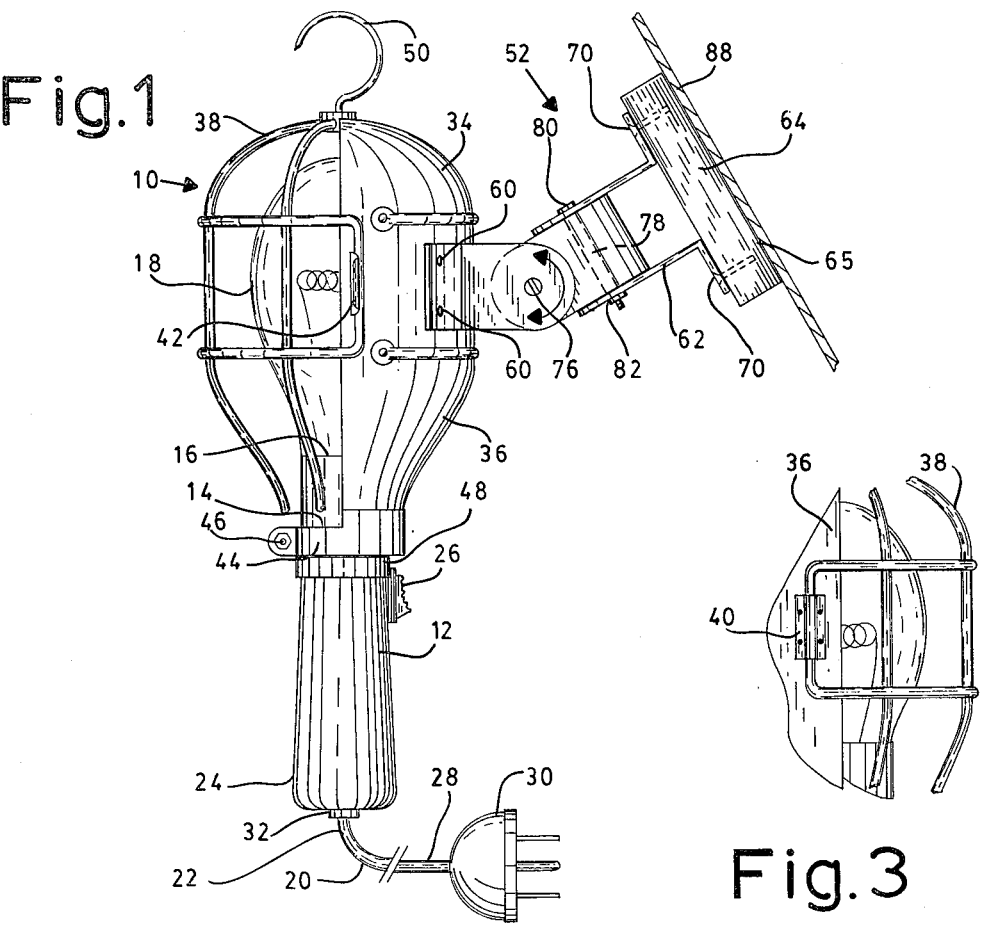
Fig. 1
Fig. 3

SHOP LIGHT

DESCRIPTION

1. Technical Field

This invention relates generally to shop lights for illuminating a work area, and more particularly to an improved shop light provided with dual axis magnetic pivoting means to facilitate the selective positioning of the shop light to achieve the most desirable illumination.

2. Background Art

There are various types of shop lights presently on the market and in use, featuring various mounting devices for enhancing the selective positioning of the shop light for the desired angle of illumination. Such prior art shop lights have included magnetic mounting devices and various means for selectively adjusting the angle of the light. However, these prior art shop lights have consistently been either difficult to adjust, requiring the operator to divert his attention from his labors for even minor adjustments in the position of the light, or have had limited facility for pivoting to the most desirable angle.

For example, U.S. Pat. No. 1,932,143 issued to Earl R. Piercy on Oct. 24, 1933, discloses a lamp with a magnetic mounting device; however, the device has limited pivoting capability and requires the operator to divert his attention from his labors to readjust the position of the lamp. Similarly, U.S. Pat. No. 2,460,173 issued to Anthony T. Halbing on Jan. 25, 1949 and U.S. Pat. No. 2,506,400 issued to Lewis K. Wietz on May 2, 1950, disclose little facility for pivoting the angle of illumination without removing and remounting the shop light.

Therefore, it is an object of the present invention to provide a shop light with a mounting device capable of releasable attachment to a metallic surface.

Another object of the present invention is to provide a shop light which, once in place, may be pivoted to the most desirable angle for illumination of the work area without requiring the operator to divert his attention from his labors.

Yet another object of this invention is to provide a shop light with a pivoting magnetic mounting device which is inexpensive to manufacture and simple to manipulate.

DISCLOSURE OF THE INVENTION

Other objects and advantages will be accomplished by the present invention which provides an improved shop light for being releasably mounted in a desired location to selectively illuminate a work area. The improved shop light comprises a handle member for grasping and holding the shop light, the handle member being provided with a light bulb socket at its first end portion for releasably receiving a light bulb. Electrical power is supplied to the light bulb socket by a cord having a first end portion received in the handle member and routed through an on/off switch to the light bulb socket. A guard member is provided for protecting the light bulb from damage. The guard member comprises a back portion releasably engaged to the handle member, and a front cage portion hingedly connected to the back portion of the guard member. The back portion of the guard member is further provided with a hook member for releasably hanging the shop light in a desired location. The shop light further comprises a dual axis magnetic mounting member, the mounting member comprising first and second clevis members and a connecting member. The first clevis member is mounted on the back portion of the guard member and pivotally secured to the connecting member upon a first axis by an adjustable pivot bolt. The second clevis member comprises a pair of bracket members mounted on a magnet, the magnet serving to allow the shop light to be mounted on a metal surface. The bracket members of the second clevis member pivotally engage the connecting member upon a second axis, perpendicular to the first axis, and are secured by a suitable pivot bolt.

BRIEF DESCRIPTION OF THE DRAWINGS

The above-mentioned features of the invention will become more clearly understood from the following detailed description of the invention read together with the drawings in which:

FIG. 1 illustrates a side view of the shop light as it is mounted on a metallic surface.

FIG. 2 illustrates a perspective view of the dual axis magnetic mounting member of the present invention.

FIG. 3 illustrates a partial side view of the shop light, and more specifically a portion of the guard member of the present invention.

BEST MODE FOR CARRYING OUT THE INVENTION

An improved shop light incorporating the various features of the present invention is illustrated generally at 10 of FIG. 1. In the illustrated embodiment, the shop light 10 comprises a handle member 12 for manually grasping the shop light in order to selectively position the light. The handle member is most desirably fabricated or covered with a resilient durable material having insulating qualities so as to reduce the possibility of electrical shock to the operator.

At its first end portion 14, the handle member 12 carries a light bulb socket 16 for releasably receiving a standard electric light bulb 18. Electrical power is supplied to the socket 16 by a cord 20 having a first end portion 22 received in an opening (not shown) in a second end portion 24 of the handle 12, the first end portion 22 of cord 20 being routed through an on/off switch 26 and ultimately engaging the socket 16. A second end portion 28 of cord 20 carries a grounded electrical plug 30 for being received in a standard electrical outlet. Further, in a preferred embodiment the handle 12 is provided with a stop grommet 32 which is fixedly received in the second end portion 24 of handle member 12, and fixedly engages and encircles cord 20 to prohibit cord 20 from being pulled from the handle member 12.

The shop light 10 is further provided with a guard member 34 to protect the bulb 18 from being damaged as the shop light 10 is selectively moved about by the operator, and to prohibit the bulb 18 from directly contacting and/or damaging other surfaces or objects should it become necessary to rest the shop light against any such surfaces or objects. The guard member 34 is provided with a back portion 36 which partially encloses the bulb 18, the back portion 36 preferably being fabricated of a light durable metal capable of quickly dissipating heat. However, it will be appreciated that various durable materials may be used in such fabrication. Further, it is desirable that the interior surface (not shown) of back portion 36 comprise a reflective surface in order to enhance and direct the illumination provided by bulb 18.

The guard member 34 further comprises a front cage portion 38 which encloses and protects that portion of the bulb 18 not enclosed by back portion 36. In order to allow access to the bulb 18 and the socket 16 for bulb replacement, the cage portion 38 is hingedly mounted on back portion 36 by hinge member 40 as illustrated in FIG. 3, thus allowing the cage portion 38 to be selectively opened and closed with respect to back portion 36. Further, a snap clip 42 is provided on back portion 36 to releasably engage cage portion 38 and hold it in a closed position.

The guard member 34 is releasably fastened to the handle member 12 with a clamp member 44, the clamp member 44 being integrally formed with back portion 36. The clamp member 44 encircles the handle member 12 proximate the first end portion 14 and is releasably fastened with a suitable fastener 46. Thus, if desired, the guard member 34 may be completely removed and the shop light 10 used without the guard member 34. In the preferred embodiment of FIG. 1, the handle member 12 is further provided with an encircling ridge portion 48 having an increased cross-sectional diameter relative to the handle member 12. This ridge portion 48 prohibits the movement of clamp member 44 toward second end portion 24 of handle member 12, and thus, eliminates slipping or encroachment of the clamp member 44 on that portion of the handle member 12 which is grasped by the operator.

In one embodiment of the shop light 10, a hook member 50 is provided. The hook member 50 is fixedly engaged to the back portion 36 of guard member 34 and allows the shop light 10 to be releasably hung on various objects in order to secure the shop light in a desired location.

The shop light 10 further comprises a dual axis magnetic mounting means 52 for releasably attaching the shop light 10 to various metallic surfaces. The mounting means 52 comprises a first clevis member 54 provided with an arcuate portion 56. The arcuate portion 56 is provided with a plurality of mounting holes 58 (see FIG. 2) and is releasably mounted on back portion 36 of guard member 34 with a plurality of screws 60 inserted through holes 58 and through corresponding mounting holes (not shown) in back portion 36, and secured with suitable nuts (not shown). It will be appreciated by those skilled in the art that arcuate portion 56 of first clevis member 54, may fixedly engage, or be integrally formed with, back portion 36 of guard member 34. However, the releasable attachment of clevis member 54 provides the operator with the option of completely removing the mounting means 52 if desired.

The mounting means 52 further comprises a second clevis member 62. The clevis member 62 in turn comprises a magnet 64 carrying a pair of oppositely disposed bracket members 66 and 68 fastened to magnet 64 by a plurality of fasteners 70. The magnet 64 allows the shop light 10 to be mounted on various metallic surfaces including various parts of a motor vehicle. Further, in a preferred embodiment, the magnet 64 is provided with a flat or planar surface 65, thus allowing the magnet 64 to serve as a supporting base such that the shop light 10 may be placed on any horizontal or substantially horizontal surface, supported by mounting means 52 with the surface 65 contacting such horizontal or substantially horizontal surface, whether such surface is metallic or non-metallic. This, for example, would allow the operator to place the shop light 10 in a standing position on the floor beneath a motor vehicle to illuminate selected areas under such vehicle. The first clevis member 54 and the second clevis member 62 are pivotally engaged on two perpendicularly aligned axis by connecting member 72. To accomplish this, the connecting member 72 is provided with a first hole 74 and is pivotally secured to first clevis member 54 by passing a pivot bolt 76 through corresponding holes in clevis member 54 and hole 74, and securing bolt 76 with a suitable nut (not shown). Similarly, connecting member 72 is provided with a second perpendicularly disposed hole 78 and is pivotally secured to the second clevis member 62 by passing a second pivot bolt 80 through a corresponding hole in bracket member 66, through hole 78 and through a corresponding hole in bracket member 68, the bolt 80 being secured with the nut 82.

In the preferred embodiment, the connecting member 72 is fabricated of, or covered with, a durable rubber or rubber-like material. Thus, when the bolts 76 and 80 are tightened to a preselected pressure the resulting friction between the connecting member 72 and the clevis members 54 and 62 is sufficient to hold the shoplight 10 in a stationary position yet such friction may be overcome by manual manipulation by the operator in order to selectively pivot the shop light into a new desired stationary position without the further manipulation of the bolts 76 and 80. This eliminates the necessity of manually untightening and retightening the pivot bolt every time the operator needs to reposition the shop light, and allows the operator to reposition the light with a minimum interruption to his labors. Further, the fabrication of the connecting member 72 from a rubber or rubber-like material serves as an insulator between the first clevis member 54 and the second clevis member 62, thus insulating the electrical components of the shop light 10 from any metallic surface to which it is attached and providing for safer operation of the shop light 10.

It will be further appreciated that the incorporation of magnet 64 greatly facilitates the operator's ability to position the shop light to obtain the maximum benefit of its illumination. As is illustrated in FIG. 1, the shop light 10 may be mounted on a metallic surface 88 by releasably securing magnet 64 to the surface 88. Accordingly, the light 10 may be mounted on the interior surface of an automobile hood or various other metallic and magnetic parts of an automobile or other vehicle, eliminating the need for finding a structure to hang the shop light on, such structures often being undesirably located for proper illumination of the work area. The handle 12 gives the operator the option of holding the shop light in his hand and the hook member 50 allows the light to be hung in a desired position when appropriate structures are available making the shop light of the present invention an extremely versatile tool where selective illumination is required While a preferred embodiment has been shown and described, it will be understood that there is no intent to limit the invention to such disclosure, but rather it is intended to cover all modifications and alternate constructions falling within the spirit and scope of the invention as defined in the appended claims.

I claim:

1. An improved mounting device for use on a shop light for enhancing the selective illumination of a work area, said shop light being provided with a reflector guard member, said mounting device comprising:

a first clevis member having an arcuate base member including means for releasable attachment to such guard member and a pair of upstanding parallel arms, each of said arms being provided with an aligned aperture;

a permanent magnet member;

a second clevis member releasably attached to said magnet having a pair of parallel brackets, each of said brackets being provided with an aligned aperture;

a connector member having first and further ends, said first end proportioned to closely fit between said arms of said first clevis and provided with a first aperature, and said further end proportioned to closely fit between said brackets of said second clevis and provided with a further aperture, with axes of said first and further apertures of said connector member oriented perpendicularly to each other;

a first pivot member passing through said aligned apertures in said arms of said first clevis member and said first aperture of said connector member, said first pivot member being provided with means for producing frictional engagement between said arms and said first end of said connector member; and a second pivot member passing through said apertures of said brackets of said second clevis and said further aperature of said connector member, said second pivot member being provided with means for producing frictional engagement of said further end of said connector member and said brackets of said second clevis.

2. The mounting device of claim 1 wherein at least the surface of said connector member is resilient to enhance frictional engagement with said arms and said brackets.

3. The mounting device of claim 1 wherein said magnet is provided with an extended planar surface oriented in a direction substantially perpendicular to said brackets for assuring support of such shop light upon a surface substantially angled vertically and horizontally allowing low used extreme inclines of said surface.

4. The mounting device of claim 1 wherein said first and second pivot members are bolts having enlarged slotted heads at one end, said bolts being provided with external threads at a further end, and internally threaded adjustment nuts threadably engaged with said threads.

5. The mounting device of claim 1 wherein said permanent magent member is rectangular in configuration, and said connecting member is an insulating and entirely resilient body.

* * * * *